(12) United States Patent
Nolfi et al.

(10) Patent No.: US 6,824,356 B2
(45) Date of Patent: Nov. 30, 2004

(54) FOREIGN MATERIAL EXCLUSION DEVICE

(75) Inventors: Thomas Joseph Nolfi, Chardon, OH (US); Mario Michael Nolfi, Twinsburg, OH (US); Stephen William Orosz, Vermilion, OH (US)

(73) Assignee: Advanced Pneumatics Inc., Mentor, OH (US)

(*) Notice: Subject to any disclaimer, the term of this patent is extended or adjusted under 35 U.S.C. 154(b) by 0 days.

(21) Appl. No.: 10/320,032

(22) Filed: Dec. 16, 2002

(65) Prior Publication Data

US 2004/0028523 A1 Feb. 12, 2004

Related U.S. Application Data

(63) Continuation of application No. 09/915,613, filed on Jul. 26, 2001, now Pat. No. 6,506,014.

(51) Int. Cl.⁷ .............................................. F01D 11/00
(52) U.S. Cl. ................. 415/170.1; 415/191; 29/889.21
(58) Field of Search .......................... 415/170.1, 174.2, 415/191, 209.2–209.4, 189–190; 29/889.21, 889.1, 888.011, DIG. 94

(56) References Cited

U.S. PATENT DOCUMENTS

| | | | |
|---|---|---|---|
| 798,031 A | 8/1905 | Gherky | |
| 4,462,430 A | 7/1984 | Anthony et al. | |
| 4,964,438 A | 10/1990 | Welty | |
| 4,984,322 A * | 1/1991 | Cho et al. | 15/104.061 |
| 5,558,130 A * | 9/1996 | McCabe et al. | 138/89 |
| 5,644,394 A * | 7/1997 | Owens | 356/241.5 |
| 5,690,469 A | 11/1997 | Deal et al. | |
| 5,765,993 A * | 6/1998 | Weiss | 415/209.2 |
| 5,771,937 A * | 6/1998 | Collins | 138/93 |
| 6,032,515 A * | 3/2000 | Huber | 73/49.1 |
| 6,173,491 B1 * | 1/2001 | Goodwater et al. | 29/889.1 |
| 6,244,301 B1 * | 6/2001 | Scott et al. | 138/89 |
| 6,381,797 B1 * | 5/2002 | Filippovitch et al. | 15/104.061 |
| 6,506,014 B1 * | 1/2003 | Nolfi et al. | 415/170.1 |

OTHER PUBLICATIONS

"Disclosure of Information Under Rule 37 C.F.R. § 1.56" by Thomas J. Nolfi, President, Advanced Pneumatics Inc.

* cited by examiner

*Primary Examiner*—Edward K. Look
*Assistant Examiner*—James M. McAleenan
(74) *Attorney, Agent, or Firm*—Hudak, Shunk & Farine, Co. LPA

(57) ABSTRACT

A device which can be utilized to temporarily seal substantially any opening on a turbine which is being assembled or repaired. The foreign material exclusion device includes a main body, preferably formed from a foamed polymer or rubber. The foreign material exclusion device is substantially elastic or resilient and can be compressed to fit into a desired opening and can be reexpanded to provide a snug fit about an opening. An extraction member is connected to the main body and is preferably utilized to remove the device from a portion of a cavity of a turbine.

10 Claims, 8 Drawing Sheets

FOREIGN MATERIAL EXCLUSION DEVICE

CROSS-REFERENCE

This is a continuation of application Ser. No. 09/915,613, filed on Jul. 26, 2001, now U.S. Pat. No. 6,506,014 of Thomas J. Nolfi, et al, for FOREIGN MATRIAL EXCLUSION DEVICE.

FIELD OF THE INVENTION

The present invention relates to a device which prevents the entry of foreign or unwanted material into predetermined areas of a turbine assembly. The device can be utilized to temporarily seal substantially any desired opening on a turbine while the same is being assembled.

BACKGROUND OF THE INVENTION

Energy supplying power plants, whether nuclear, hydro or fossil fueled, contain numerous turbine assemblies which play an integral part in energy production. Power shortages and outages have become increasingly more common and well publicized in recent years. Both experts and the press have highlighted the fact that few new power plants are being constructed to alleviate the dwindling power supply.

It is important that the turbines in power plants be constructed and maintained with the utmost efficiency. Loss of a large plant during a time of high power demand can cost over five million dollars per hour for replacement power or blackouts if replacement power is not available. The power plants alone can lose millions of dollars when a turbine is down for maintenance or due to breakage. Turbines have a large number of crevices and openings. During maintenance or assembly, small parts, screws, bolts, or other foreign objects can fall into these crevices. If not retrieved or noticed, these small parts have the potential to destroy a turbine and create hazardous situations such as by having a broken rotor piece explode through the turbine housing.

Various attempts of limited success have been made to combat the foreign material problem prior to the discovery of the present invention. One such attempt was the use of plywood to cover the sensitive areas of a turbine. The drawbacks of plywood were many, including difficulty in proper size formation and ability to secure the plywood in an opening. Further difficulties included the fact that once a turbine was assembled it was all but impossible to remove the plywood from inner portions of the turbine without breaking or partitioning the same, thus creating a further foreign material problem. Inflatable rubber air bladders have also been utilized to seal turbine openings with limited success. The bladders had to be continually monitored to make sure that proper air pressure was maintained to insure a good seal. The air bladders were heavy and had to be removed prior to turbine assembly, leaving the turbine completely exposed during this critical juncture.

It has been found by the inventors of the present invention that aforementioned problems can be avoided by utilizing a device which prevents small misplaced parts or foreign objects from gaining access to sensitive areas of a turbine assembly. It is also easily removable from an assembled turbine through existing man way openings; i.e. openings that are too small for existing devices.

SUMMARY OF THE INVENTION

The present invention relates to foreign material exclusion devices which can be used to prevent foreign materials from becoming lost or trapped within a turbine, more specifically predetermined areas of a turbine while being assembled or repaired. The foreign material exclusion devices preferably comprise an elastomer of resilient plastic or rubber or foam such as a plastic foam or rubber foam composition.

An important aspect of the present invention is that the foreign material exclusion devices can be placed in any desirable turbine opening or orifice at substantially any point during the assembly or repair process. Once the turbine is assembled the device can easily be removed.

DETAILED DESCRIPTION OF THE INVENTION

During the assembly or repair of a turbine assembly, or other assemblies of products such as, but not limited to, pumps, fans, housings or any other device with limited access openings and cavities, foreign material exclusion is critical and failsafe integrity of inner portions thereof is desired.

Typically, turbines are constructed from many individual sections and parts which inherently have different shapes and sizes. If foreign matter breaches certain sensitive areas of a turbine, it is possible that the turbine, because of its large mass rotating at very high speeds, can be catastrophically damaged.

Figure 1:
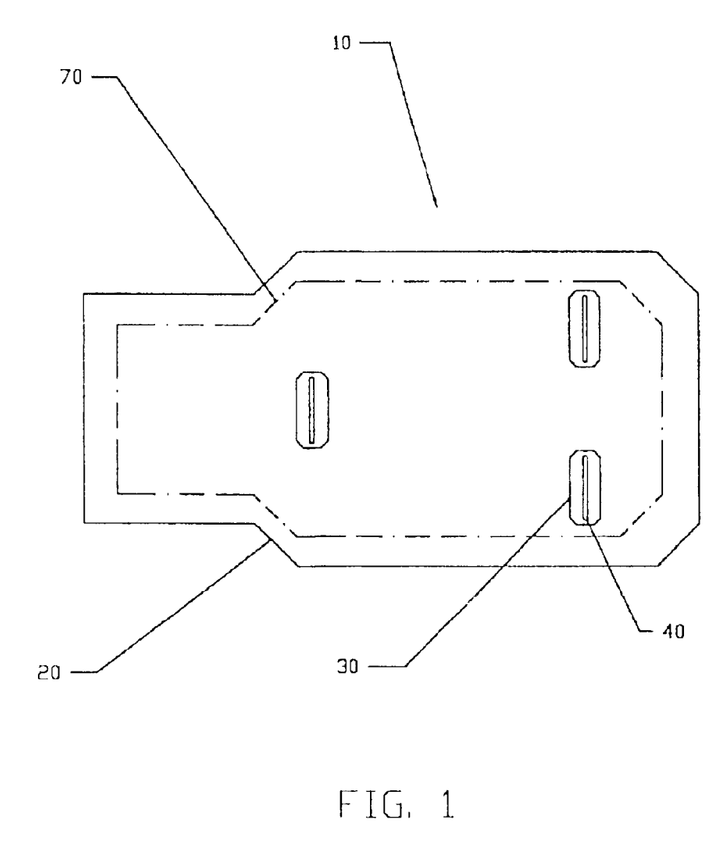
FIG. 1 is an outline view of an example of one possible design for the foreign material exclusion devices of the present invention. Also shown in phantom is the outline of a cavity into which the foreign material exclusion device is adapted to be inserted into.
Figure 2:
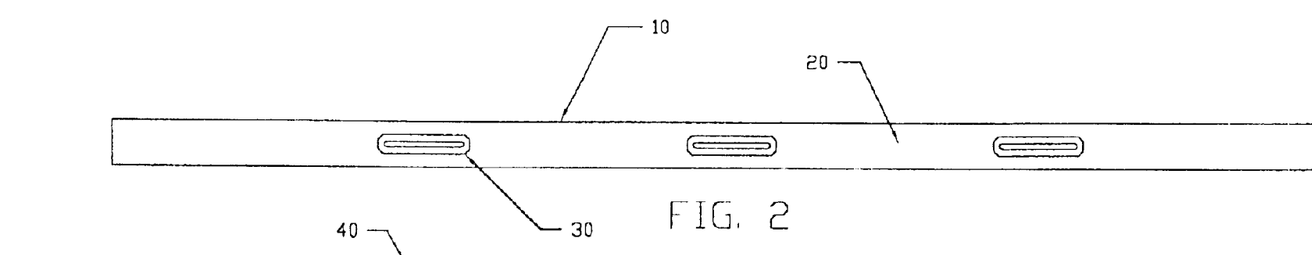
FIG. 2 and FIG. 2A are an outline view and a side view respectively, of another possible configuration for the foreign material exclusion device.
Figure 3:
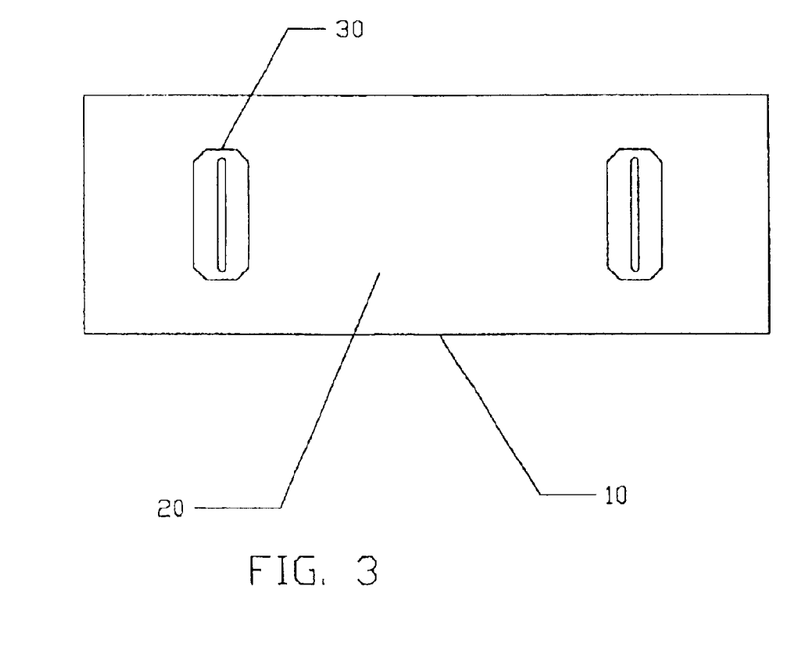
FIG. 3 and FIG. 3A are a top view and a side view respectively, of a rectangular foreign material exclusion device.

The foreign material exclusion devices of the present invention protect predetermined sensitive areas of a turbine from foreign material during maintenance or assembly. As shown in at least FIG. 1, a foreign material exclusion device or apparatus 10 generally comprises a resilient body 20, a retaining member or plate 30, and an extraction member 40. As shown in FIGS. 1, 2, and 3, the foreign material exclusion device of the present invention is not limited to a certain shape, but instead can be sized to fit any opening on a turbine assembly.

The composition of the main body of the exclusion device is generally a polymer, a rubber, or a polymer or rubber foam. It is important that the body is elastic or resilient in nature so that it can be compressed to fit into a desired opening, and yet reexpand to provide a snug fit within or about an opening on a turbine. The resiliency of the body allows the foreign material exclusion device to hold itself in place in a predetermined location or orifice of the turbine assembly.

The actual size dimensions, i.e. the length, width, and thickness of the body of the foreign material exclusion devices of the present invention will vary depending on the size and shape of the turbine or boiler assembly orifice which is to be protected or isolated. That is, the foreign material exclusion device is not limited to one specific shape or size such as a square or rectangle, but is custom tailored or profile fit to the dimensions of generally each cavity or turbine assembly orifice. The foreign material exclusion devices are substantially not cylindrical or circular and substantially do not have a constant diameter inasmuch as the turbine assembly or other orifices are irregularly shaped. The body is dimensioned to provide a resilient snug fit with the above-mentioned orifice which thereby provides a barrier to the entrance of foreign materials. Foreign materials can generally be defined as any object, particle or the like such as, but not limited to, nuts, bolts, metal bits, debris, hand tools, sockets, measuring devices, or any other material not designed to be located in a desired area of a turbine assembly. The thickness of the body is sufficient to maintain a snug or tight fit about the desired opening, with the body being generally from about 0.5 or 1 to about 12, desirably from about 2 to about 8, and preferably from about 4 to about 6 inches thick. Dimensions can vary widely by application, with the primary goal of foreign object exclusion requiring sufficient strength to retain the heaviest object used in that portion of the protected device.

The body of the foreign material exclusion device of the present invention is generally formed from a polymer or rubber, and is preferably a foam or foam like material. Foams are cellular materials generally having small hollow spaces which occur during manufacture of the foam. If the cells are fully surrounded by cell walls, the foam is called closed cell foam. In mixed cell foams, the cell walls are partially perforated. In open cell foams, the cells have gas phase connections to each other. Any of the above mentioned foam types can be utilized in the present invention so long as the foams can be resiliently compressed and prevent the foreign material from entering a predetermined area of the turbine. Generally, open cell foams are preferred as they are more flexible and elastomeric when compared to closed cell foams which tend to be compression resistant.

Suitable polymer compositions which can be foamed to form the main body of the present invention include polyethylene, e.g. low density polyethylene and high density polyethylene (HDPE), polypropylene, and co-polymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid or methylacrylic acid and $C_{1-4}$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density); etc.

Other suitable polymeric compositions which may be used in the practice of this invention include, but are not limited to, polyesters, polyamides, polyvinylchloride, polyvinylidene chloride, polycarbonates, polyurethanes, and polystyrene resins.

Rubbers include copolymers of ethylene and propylene and can be prepared by known addition polymerization techniques, including the use of small amounts of a diene such as butadiene. Additional rubber or elastomeric components include various conjugated dienes having from 4–8 carbon atoms such as isobutylene, butadiene, and ethylene/propylene/diene interpolymers may be included in the blend if desired. Rubbers include the aromatic containing rubbers such as styrene, butadiene rubber and the like. Moreover, additional components such as cross linking agents designed to provide latent cross linking of the ethylenic or propylenic polymer, such as silane functional cross linking agents, or covalent or ionic cross linking agents, may be included if desired.

The thermoplastic polymer material or blend is melt processed in a conventional manner by feeding, melting, and metering into a conventional melt processing apparatus such as an extruder. A volatile blowing agent and an optional cross linking agent are mixed with the polyolefin polymer or blend under a pressure suitable to form a flowable gel or admixture. A cross linking agent may be added in an amount which is sufficient to initiate cross linking and raise the pressure of the mixture to less than that pressure which causes melt fracture of the polymer to occur. The term "melt fracture" is used in the art to describe a melt flow instability of a polymer as it is extruded through a die, which flow instability causes voids and/or other irregularities in the final product. Any other known methods for producing foam compositions can also be utilized to form the foam utilized in the present invention.

The foam blends are generally prepared by heating the desired polymer or rubber to form a plasticized or melt polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

The polymer or rubber foam may be open or closed-celled, as desired. The percentage of open cells can be controlled, as is well known in the art, by appropriate selection of blowing agents, additives, polymers, and processing parameters, such as temperatures, pressures, and extrusion rates. The preferred foam of the present invention is polyester and is available from Orbis Manufacturing of Mentor, Ohio.

While the density of the foam can vary, the foams of the present invention are generally considered lightweight and range generally from about 1 to about 200 or 300 $kg/m^3$, desirably from about 5 to about 100 $kg/m^3$ and preferably from about 10 or 20 to about 50 or 75 $kg/m^3$.

It is also possible to add various additives such as inorganic fillers, pigments, anti-oxidants, acid scavengers, ultraviolet absorbers, flame retardants, surfactants, processing aids, extrusion aids and the like is suitable as known to those of ordinary skill in the art.

Other additives include inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, thermal decomposition type chemical foaming agents such as azodicarbonamide, benzenesulfonyl hydrazide, toluenesulfonyl hydrazide and the like, etc.

The volatile foaming agents usable in this invention generally have a boiling point temperature range of −90° C. to +80° C., and include, but are not limited to, aliphatic hydrocarbons such as n-pentane, isopentane, neopentane, isobutane, n-butane, propane, ethane and the like; fluoro-chlorinated hydrocarbons such as dichlorotetrafluoroethane, trifluoroethane, trichloromonofluoromethane, dichlorodifluoromethane, dichloromonofluoromathane and the like. Among them, the non-fully halogenated hydrocarbons are preferred on account of environmental considerations. Particularly preferred among the non-fully halogenated hydrocarbons are partially or fully fluorinated hydrocarbons and non-fully halogenated fluoro-chlorinated hydrocarbons. Examples of these include 1-chloro-1,1-fluoroethane, 1,1,1,2-tetra fluroethane and 1,1-difluoroethane. Particularly preferred among the aliphatic hydrocarbons is isobutane and isobutane/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of this invention. Also contemplated are combinations including water and/or carbon dioxide as the primary blowing agent.

As stated above, the foreign material exclusion device also includes a retaining member or plate 30, as shown in at least FIG. 1. The retaining member generally provides support to the body in an area where an extraction member is attached. The retaining member maintains alignment of the extraction member during retraction and prevents the same from being pulled through the relatively less dense foam body. It also assists in the handling of the device during insertion and retraction. The retaining member includes from about 1 to about 10, and preferably two apertures or holes which allow connection to the extraction member.

Figure 4:
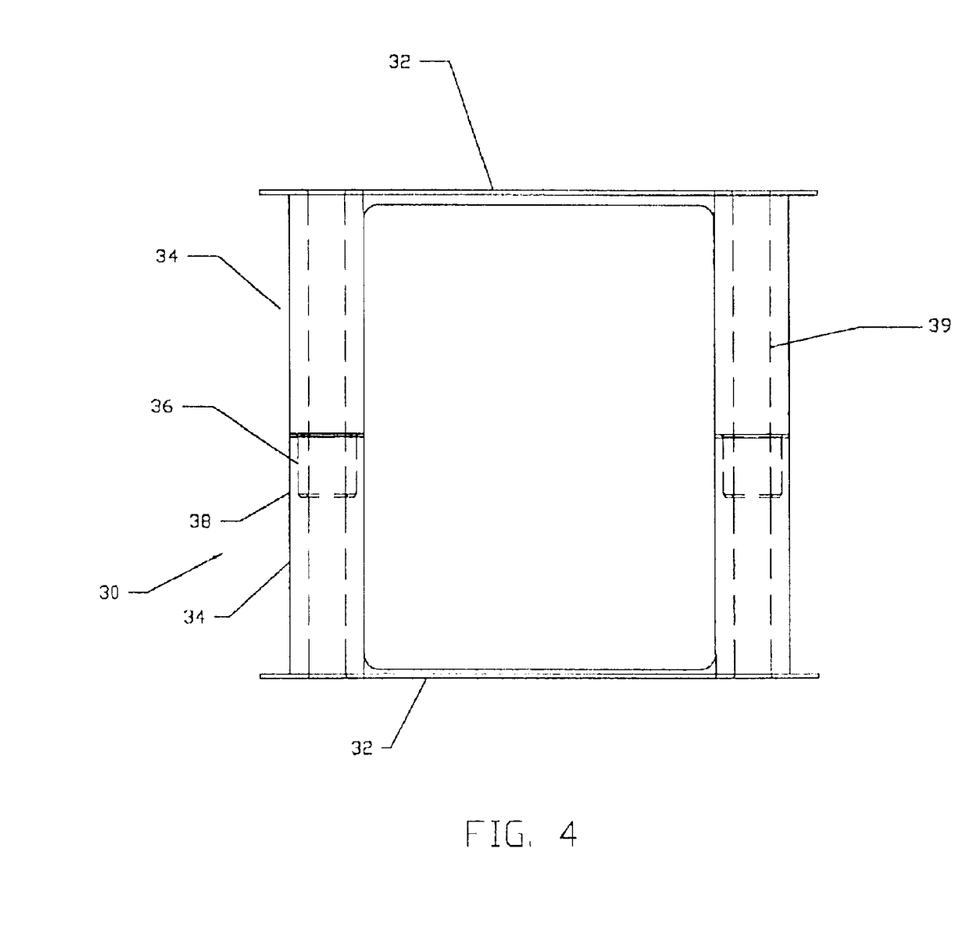
FIG. 4 is a side view of an assembled retaining member for the foreign material exclusion device.

The preferred embodiment of the retaining member is shown in FIG. 4. The retaining member 30, as shown in FIG. 4, is generally a two-piece fitting wherein a first fitting is connected to a second fitting wherein a portion of the main body can be held therebetween. Each fitting has a surface section 32 which is substantially planar and can be substantially any planar shape, including but not limited to, a circle, square, rectangle or other geometric shape. The thickness of the retaining member surface section must be sufficient to accomplish the above stated goals and is generally from about 0.025 or 0.05 to about 0.5 or 1 inch and preferably from about 0.0625 to about 0.25 inch. A post section 34 is attached to surface section 32. The post section 34 has either a male connector 36 or a female connector 38 which allows the two fittings of the retaining member to be interconnected as shown in FIG. 4.

Post section 34 of the retaining member 30 is shown generally cylindrical, but can be any desired shape such as square or oblong. The post section includes a hole or recess 39 generally centrally disposed therein and running the length thereof. As will be described hereinbelow, the recess 39 allows the extraction member to be operatively connected to the foreign material exclusion device.

Figure 4A:
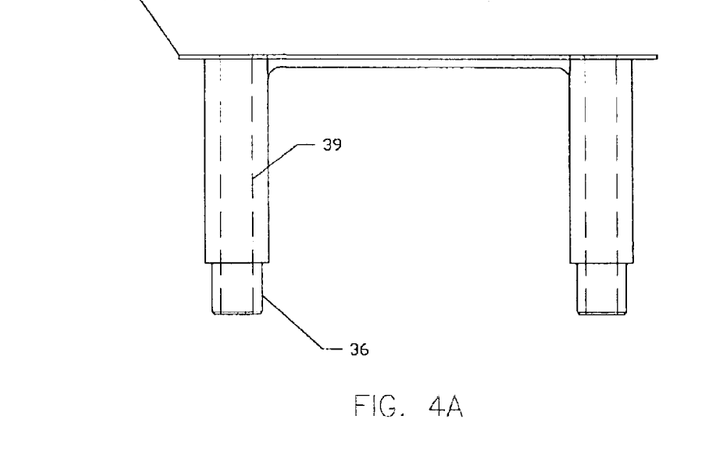
FIG. 4A through FIG. 4D show various aspects of the retaining member of the present invention.
Figure 4B:
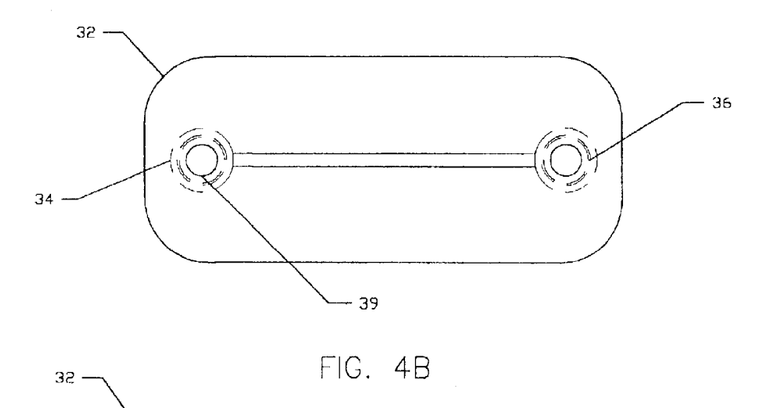
Figure 4C:
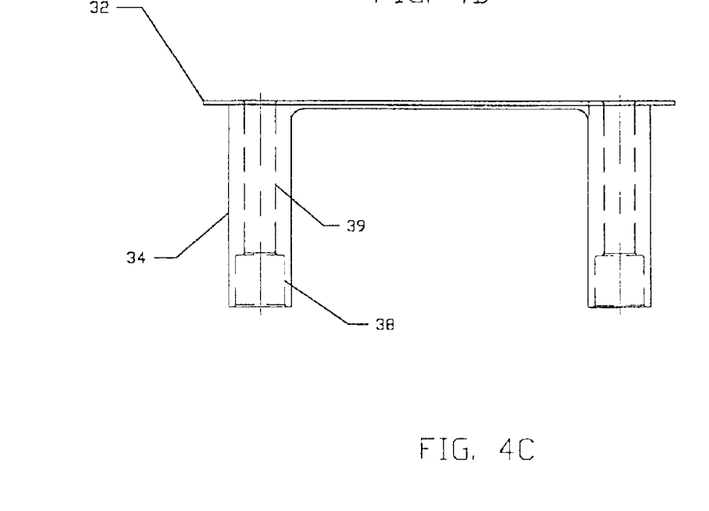
Figure 4D:
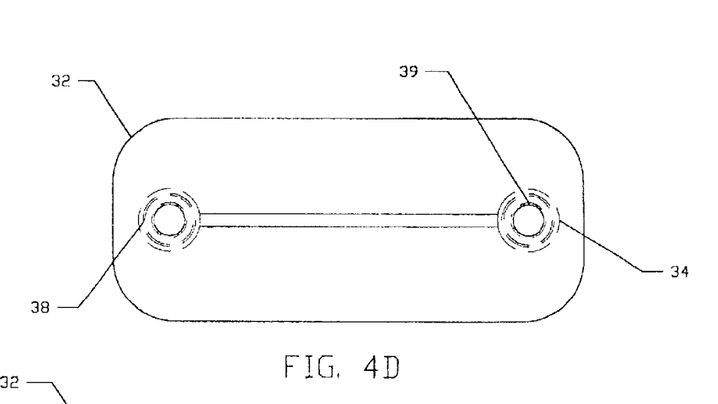

The surface section of the retaining member 32 is generally planar and can have any shape as described hereinabove. As shown in FIGS. 4A and 4C, surface section 32 connects two post sections. It is also foreseeable that the surface section can have only one post section connected thereto or also that more than two post sections can be connected together via planar surface section 32.

Figure 5A:
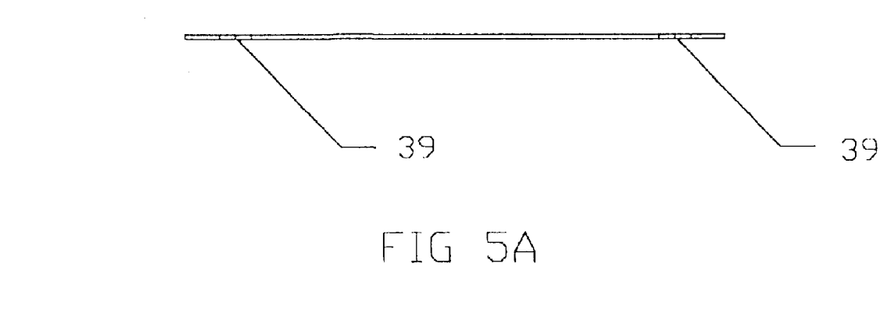
FIGS. 5A through 5C show various portions of an alternative embodiment for the retaining member of the present invention.
Figure 5B:
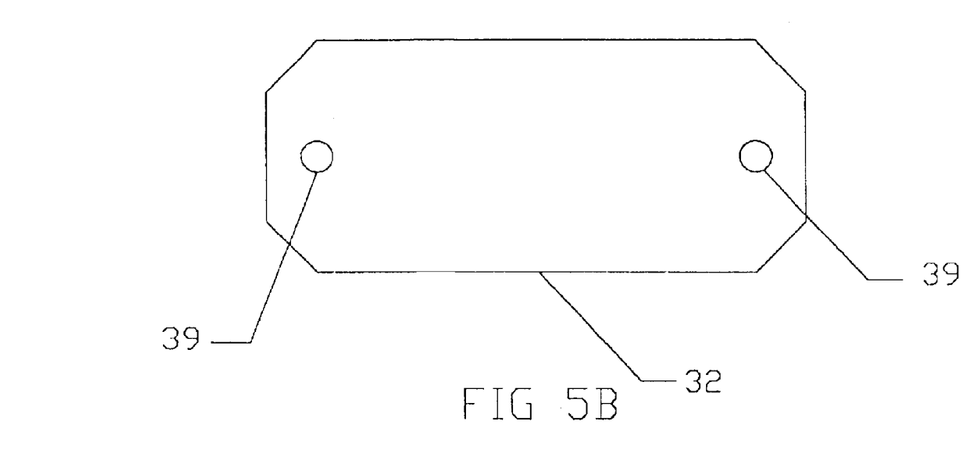
Figure 5C:
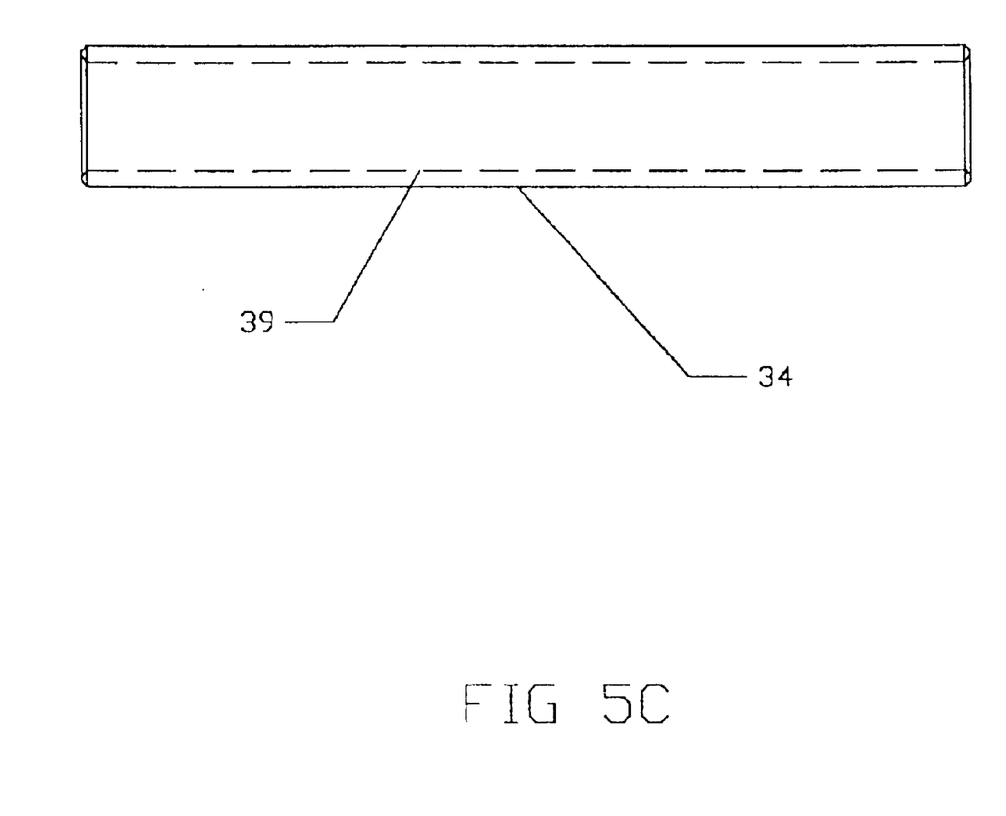

In an alternative embodiment, retaining member 30 of the present invention can comprise a number of separate members as shown in FIGS. 5A through 5C. For example, surface section 32 as shown in FIG. 5B is a separate member from post section 34 as shown in FIG. 5C. The separate members function in a similar way as the connected members of the retaining member as described hereinabove.

The retaining member can be made from generally any rigid or semi-rigid materials such as but not limited to metal, wood, fiberglass, ceramic, carbon fiber, and the polymer or rubber, or polymer foam or rubber foam listed above which have not been foamed and are herein incorporated by reference, e.g. polyethylene, polypropylene, polyvinyl chloride, etc. Preferably, the retaining member is polyvinyl chloride. The retaining member importantly prevents the extraction member from being pulled through the relatively softer body while maintaining alignment of the relative parts.

Figure 1A:
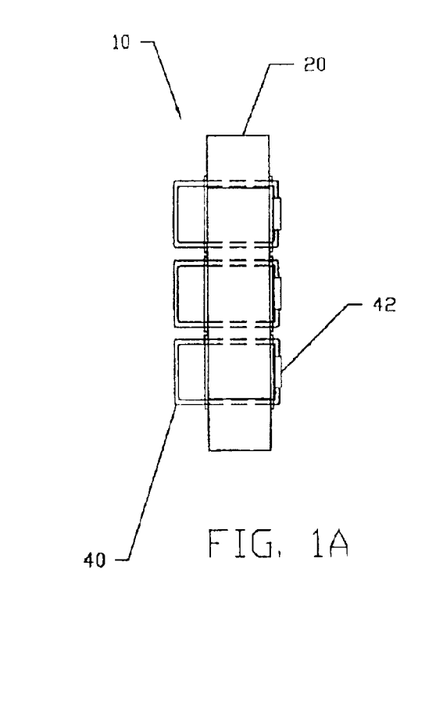
FIG. 1A is a side view of the foreign material exclusion device shown in FIG. 1. The portion of the retaining members located within the main body are shown in phantom.
Figure 2A:
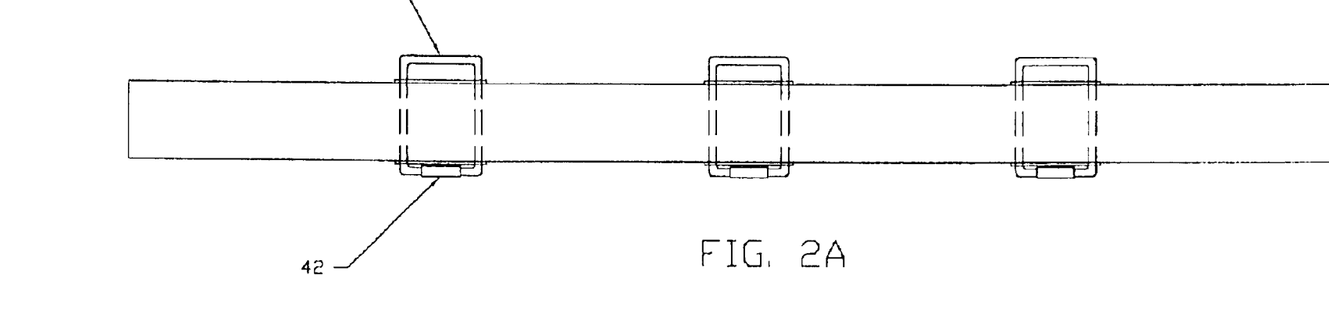
Figure 3A:
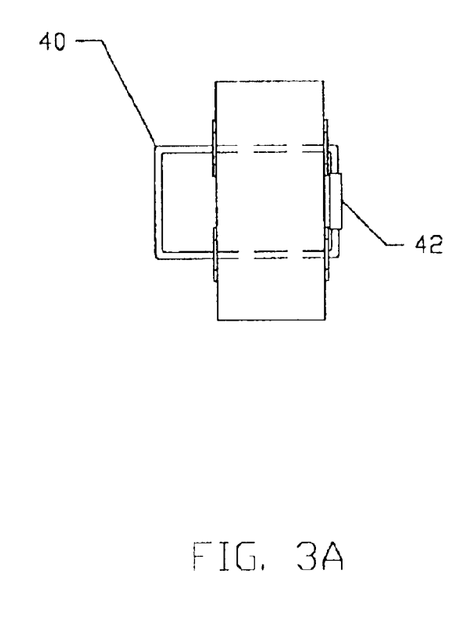

An extraction member 40 is connected to the body through retaining member 30 to allow the foreign material exclusion device to be removed from its location in the turbine assembly once the device is no longer needed. The extraction member is adapted to be fastened to a rope, string, line, or cable which is pulled on by a person in order to allow remote extraction of the foreign material exclusion device. The extraction member does not contact the body due to the configuration or presence of the retaining member. Any number of extraction members can be attached to the main body. Generally, an extraction member forms a loop which is attached to the main body and retaining member. As shown in FIGS. 1A, 2A, and 3A, two ends of the extraction member have each been inserted through recess 39 of the retaining member and thus through the main body. The ends are tied or otherwise suitably fastened to form a loop and a piece of shrink-wrap 42 is optionally attached to the knot to prevent the same from becoming untied or undone. The extraction member is generally a rope, line, or cable made from any woven or nonwoven, natural fiber, such as cotton, or synthetic material such as nylon or nonfoamed thermoplastic as stated hereinabove. Nylon is preferred.

Optionally, a flame retardant, resistant, or quenching coating or covering can be applied to the foreign material exclusion device, preferably on the main body thereof. The flame retardant coating or covering can be applied to one or more sides of the main body, especially the portion thereof which can be exposed to high temperature debris, such as from a welding process on the turbine assembly.

Such coatings are well known in the art and are generally latexes such as HCF from PDI, Inc. of Circle Pines, Minn.

Coverings of the present invention include but are not limited to woven and nonwoven natural and synthetic fibers, and are available from Sandel of Amsterdam, N.Y. as Non-combustible Fiber.

In order to seal a desired cavity or orifice of a turbine or other assembly, measurements are taken of the orifice to be sealed. The main body of the foreign material exclusion device is custom fabricated to the measurements of the orifice, wherein the main body of device is sized from about 2.5 to about 40 percent and preferably from about 5 to about 20 percent larger in dimension than the orifice to allow for compression. After the main body is fabricated, at least one retaining member and extraction member are assembled thereon. The foreign material exclusion device is then hand inserted into the predetermined orifice in the desired location.

As can be imagined, turbines and other assemblies contain numerous openings or orifices which must be protected against potentially harmful foreign material. Accordingly, the present invention also relates to a kit containing two or more foreign material exclusion devices of various predetermined sizes according to the openings to be sealed. Thus, a whole set of foreign material exclusion devices can be developed for a particular turbine assembly to substantially cover all applicable orifices and be sold in a single kit.

In accordance with the patent statutes, the best mode and preferred embodiment have been set forth, the scope of the invention is not limited thereto, but rather by the scope of the attached claims.

What is claimed is:

1. A foreign material exclusion device adapted to temporarily seal an opening of a power plant being assembled or repaired having a first side of a cavity from a second side of said cavity, said foreign material exclusion device comprising:

a resilient main body, said main body comprising a polymer, a rubber, or a foam thereof, said body adapted to be placed in said cavity in order to seal said first side from said second side and prevent a foreign material from entering from said first side to said second side, and at least one extraction member operatively connected to said main body to allow said foreign material exclusion device to be removed from said cavity, said extraction member comprising a rope, line, or cable.

2. A device according to claim 1, wherein said main body comprises said polymer or rubber foam.

3. A device according to claim 2, wherein said main body is polyester, polyethylene or polypropylene foam, or copolymers thereof.

4. A device according to claim 2, wherein said main body is from about 0.5 to about 12 inches thick.

5. A device according to claim 4, wherein said main body on at least one surface includes a flame-resistant or retardant coating or covering.

6. A device according to claim 2, wherein said main body on at least one surface includes a flame-resistant or retardant coating or covering.

7. A device according to claim 4, wherein said foam has a density of about 1 to about 200 $kg/m^3$.

8. A device according to claim 1, wherein said main body has a dimension of from about 2.5 to about 40 percent larger than the dimensions of said cavity.

9. A device according to claim 8, wherein said main body has a dimension of from about 5 to about 20 percent larger than the dimensions of said cavity.

10. A device according to claim 8, wherein said main body comprises said polymer or rubber foam.

* * * * *